(12) United States Patent
Lee et al.

(10) Patent No.: US 12,539,476 B2
(45) Date of Patent: Feb. 3, 2026

(54) FILTER MEDIUM AND COMPOSITE FILTER INCLUDING SAME

(71) Applicant: AMOGREENTECH CO., LTD., Gimpo-si (KR)

(72) Inventors: Seoung Hoon Lee, Gimpo-si (KR); Jun Keun Cho, Gimpo-si (KR); Chan Kim, Gimpo-si (KR); Kyung Su Kim, Gimpo-si (KR); Seon Ho Jang, Gimpo-si (KR); Yun Mi So, Gimpo-si (KR)

(73) Assignee: AMOGREENTECH CO., LTD., Gimpo-si (KR)

( * ) Notice: Subject to any disclaimer, the term of this patent is extended or adjusted under 35 U.S.C. 154(b) by 975 days.

(21) Appl. No.: 17/629,127

(22) PCT Filed: Jul. 22, 2020

(86) PCT No.: PCT/KR2020/009665
§ 371 (c)(1),
(2) Date: Jul. 1, 2022

(87) PCT Pub. No.: WO2021/015554
PCT Pub. Date: Jan. 28, 2021

(65) Prior Publication Data
US 2022/0347609 A1 Nov. 3, 2022

(30) Foreign Application Priority Data

Jul. 22, 2019 (KR) .................. 10-2019-0088420
Nov. 18, 2019 (KR) .................. 10-2019-0147953

(51) Int. Cl.
*B01D 53/22* (2006.01)
*B01D 39/16* (2006.01)
(Continued)

(52) U.S. Cl.
CPC ..... *B01D 39/1623* (2013.01); *B01D 46/0032* (2013.01); *B01D 46/521* (2013.01);
(Continued)

(58) Field of Classification Search
CPC ............ B01D 39/1623; B01D 46/0032; B01D 46/521; B01D 2239/025;
(Continued)

(56) References Cited

U.S. PATENT DOCUMENTS 6,336,947 B1 * 1/2002 Atsumi .............. B01D 46/0001
55/486
8,784,542 B2 7/2014 Dullaert et al.
(Continued)

FOREIGN PATENT DOCUMENTS

KR 20040049760 A 6/2004
KR 100603956 B1 7/2006
(Continued)

OTHER PUBLICATIONS

KR 101542734 (Machine Translation used as official translation) (Year: 2015).*
(Continued)

*Primary Examiner* — Anthony Shumate
(74) *Attorney, Agent, or Firm* — ROTHWELL, FIGG, ERNST & MANBECK, P.C.

(57) ABSTRACT

Provided is a filter medium. A filter medium according to an embodiment of the present invention comprises: a first porous support body which has been electrostatically treated; and a nanofiber web which is disposed on one surface of the first support body and formed by accumulating nanofibers. Accordingly, excellent air filtering efficiency is obtained even for fine dust of PM 2.5 or below, and furthermore, deterioration in air filtering efficiency may be prevented or minimized even when usage is extended for a
(Continued)

long period of time. Therefore, the filter medium and the composite filter according to an embodiment of the present invention can be widely utilized as media of filters for various air filtering devices.

7 Claims, 10 Drawing Sheets

(51) Int. Cl.
*B01D 46/00* (2022.01)
*B01D 46/52* (2006.01)
*A62B 23/02* (2006.01)

(52) U.S. Cl.
CPC ...... *A62B 23/025* (2013.01); *B01D 2239/025* (2013.01); *B01D 2239/0435* (2013.01); *B01D 2239/0618* (2013.01); *B01D 2239/0622* (2013.01); *B01D 2239/0627* (2013.01); *B01D 2239/0668* (2013.01); *B01D 2239/1216* (2013.01); *B01D 2239/1258* (2013.01)

(58) Field of Classification Search
CPC .... B01D 2239/0435; B01D 2239/0618; B01D 2239/0622; B01D 2239/0627; B01D 2239/0668; B01D 2239/1216; B01D 2239/1258; A62B 23/025
See application file for complete search history.

(56) References Cited

U.S. PATENT DOCUMENTS

| | | | |
|---|---|---|---|
| 10,286,350 B1 * | 5/2019 | Clements | B01D 39/1623 |
| 2008/0017038 A1 | 1/2008 | Wu | |
| 2010/0139224 A1 | 6/2010 | Lim | |
| 2012/0137885 A1 * | 6/2012 | Dullaert | D01F 6/60 427/244 |
| 2016/0138194 A1 * | 5/2016 | Kay | D01D 5/18 425/72.2 |
| 2019/0390369 A1 * | 12/2019 | Huang | B32B 5/26 |
| 2022/0347609 A1 * | 11/2022 | Lee | B01D 39/1623 |
| 2023/0390688 A1 * | 12/2023 | Song | B01D 46/0032 |

FOREIGN PATENT DOCUMENTS

| | | |
|---|---|---|
| KR | 20080098115 A | 11/2008 |
| KR | 1020090031911 A | 3/2009 |
| KR | 101126310 B1 | 3/2012 |
| KR | 20120037008 A | 4/2012 |
| KR | 101542734 B1 | 8/2015 |
| KR | 20170015552 A | 2/2017 |

OTHER PUBLICATIONS

International Search Report issued in PCT/KR2020/009665 dated Nov. 16, 2020, 3 pages.

* cited by examiner

FILTER MEDIUM AND COMPOSITE FILTER INCLUDING SAME

CROSS-REFERENCE TO RELATED APPLICATION

This application is a 37 U.S.C. 371 National Phase Entry Application from PCT/KR2020/009665, filed Jul. 22, 2020, which claims priority to and the benefit of Korean Patent Application Nos. 10-2019-0088420, filed on Jul. 22, 2019, and 10-2019-0147953, filed on Nov. 18, 2019, the disclosures of which are incorporated herein by reference in its entirety.

TECHNICAL FIELD

The present invention relates to a filter medium, and more specifically to a filter medium and a composite filter including the same.

BACKGROUND

Melt blown-based filter media can implement high efficiency while lowering pressure loss through electrostatic treatment, replacing the existing glass fibers in the market.

In spite of these advantages, the disadvantage of reduced efficiency during the actual use is acting as a major problem. Dry dust, wet dust (moisture, oil) and the like adhere to the electrostatically treated fiber, or electrostatic force is reduced by humidity and temperature, leading to a decrease in removal efficiency. In addition, there is a problem in that the efficiency drops to 60% or less after about 6 months when the air purifier is used at home. When the melt blown filer medium having an efficiency of 99.97% (@ NaCl 0.3 μm, TSI 8130A) by hydrocharging treatment is discharged with IPA, there is a fatal disadvantage that the efficiency is significantly reduced to about 40%.

In order to solve these problems, measures to reduce the size of the fibers constituting the existing melt blown filter medium have been studied and applied, but due to problems of the polymers used and production methods, there is a limit to reducing the size of the fibers as much as electrospun nanofibers.

In order to impart water and oil repellency to filters, conventionally, water/oil repellency is imparted to non-woven fabrics by various water/oil repellent processing methods. However, the conventional water/oil repellent processing method has a problem of shortening the lifespan of products due to deterioration in processing performance.

Our company uses a method of manufacturing a filter medium by mixing water and oil repellents together during electrospinning, and thus, our company can make filter media with excellent water and oil repellency by using the structure of nanofibers and water and oil repellency properties together.

Meanwhile, filters to which a conventional PTFE membrane is applied have good water repellency, but there is a problem in that the filters do not collect a lot of contaminants and do not properly pass air.

Accordingly, there is an urgent need for research on filter media that have high filtration efficiency and air permeability and low pressure loss, and can prevent a decrease in filtration efficiency even when the operating time increases.

SUMMARY OF THE INVENTION

The present invention has been devised in consideration of the above points, and it is an object of the present invention to provide a filter medium that can be widely used in various types of filters for air filtration devices and a composite filter including the same, as it has an excellent air filtration function and prevents the deterioration of air filtration performance even when the usage time is extended for a long period of time.

In order to solve the aforementioned problems, the present invention provides a filter medium, including a first porous support body which has been electrostatically treated; and a nanofiber web which is disposed on one surface of the first porous support body and formed by accumulating nanofibers.

According to an exemplary embodiment of the present invention, the nanofiber web may have a basis weight of 0.4 to 2.5 gsm.

In addition, the nanofiber web may have an average pore diameter of 0.3 to 2.5 μm, and an air permeability of 4 to 35 cfm.

In addition, the first porous support body may have a basis weight of 15 to 40 gsm.

In addition, the first porous support body may have an average pore diameter of 5 to 15 μm, and an air permeability of 25 to 40 cfm.

In addition, the filter medium may further include a second support body on the other surface of the nanofiber web corresponding to the side of the first porous support body, or between the first porous support body and the nanofiber web.

In addition, the filter medium may further include a third support body on the other surface of the first porous support body corresponding to the side of the second support body; and a fourth support body on the other surface of the nanofiber web corresponding to the side of the second support body.

In addition, the first porous support body may be a melt blown non-woven fabric.

In addition, the second support body may be a thermal bonding non-woven fabric.

In addition, the third support body and the fourth support body may be spunbonded non-woven fabrics.

In addition, the filter medium may have a filtration efficiency of 99.5% or more, and a pressure loss of 20 to 120 mmH$_2$O.

In addition, the reduction rate of the filtration efficiency measured according to Measurement Method 1 below may be 8% or less:

[Measurement Method 1]

After filtering paraffin oil with an average particle diameter of 0.4 μm through a filter medium at 95 LPM for 5 hours, the filtration efficiency is measured, and the reduction rate of the filtration efficiency is measured by calculating the reduced filtration efficiency after 5 hours compared to the initial filtration efficiency.

In addition, the nanofiber web may be a water/oil repellent nanofiber web, and the third support body may be a water/oil repellent non-woven fabric.

In addition, the present invention provides a composite filter, including the above-described filter medium, which is bent.

According to an exemplary embodiment of the present invention, the composite filter may further include a filter frame disposed to surround at least one surface of the bent filter medium.

According to the present invention, the filter medium and the composite filter including the same have very excellent air filtration efficiency even for fine dust of PM 2.5 or less, and furthermore, deterioration in air filtration performance can be prevented or minimized even when the usage time is extended for a long period of time.

Therefore, these can be widely applied as media of filters for various air filtering devices.

DETAILED DESCRIPTION

Hereinafter, exemplary embodiments of the present invention will be described in detail with reference to the accompanying drawings such that those of ordinary skill in the art may easily practice the present invention. The present invention may be implemented in various different forms, and is not limited to the exemplary embodiments described herein. In the drawings, parts that are not relevant to the description are omitted in order to clearly describe the present invention, and the same reference numerals are added to the same or similar components throughout the specification.

Figure 1:
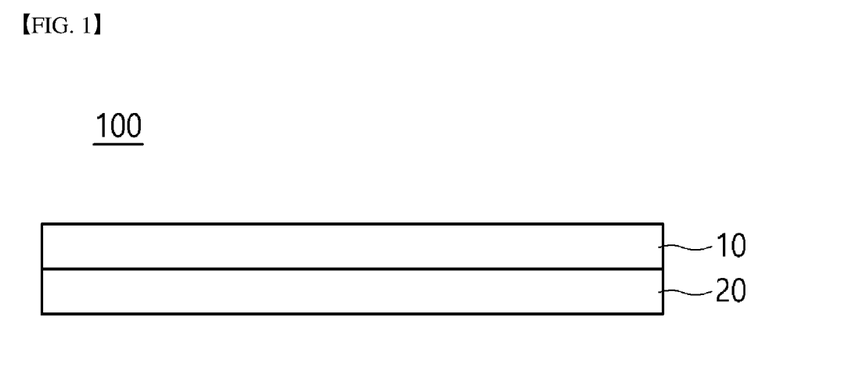
FIG. 1 is a cross-sectional view of the filter medium according to an exemplary embodiment of the present invention.

As illustrated in FIG. 1, the filter medium 100 according to the present invention is implemented by including a first porous support body 10 and a nanofiber web 20 formed of a plurality of nanofibers, which is formed on one surface of the first porous support body 10.

First, the first support body 10 will be described.

The first support body 10 is a porous member subjected to electrostatic treatment, and serves to filter fine dust, dust and the like, which are contained in the air, by using electrostatic force as a filter medium through which outside air primarily passes. For example, the first support body 10 may be a known non-woven fabric, and preferably, it may be a dry non-woven fabric such as a chemical bonding non-woven fabric, a thermal bonding non-woven fabric, an airlaid non-woven fabric or the like, or a wet non-woven fabric, a spunlace non-woven fabric, a needle punching non-woven fabric or a melt blown non-woven fabric, and more preferably, it may be a melt blown non-woven fabric.

As the melt blown non-woven fabric may be a known melt blown non-woven fabric, the present invention does not particularly limit the same.

In addition, depending on the purpose, the diameter and basis weight of the fibers contained in the porous member may be appropriately adjusted, and in order to ensure improved filtration performance, durability and the like, the first support body may include fibers with an average fiber diameter of 0.5 to 12 μm, and preferably, an average fiber diameter of 1 to 10 μm, and with a basis weight of 15 to 40 gsm, and preferably, a basis weight of 20 to 38 gsm. In addition, the average pore diameter of the first support body 10 may be 5 to 15 μm, and preferably, 7 to 12 μm.

If the basis weight of the first support body 10 is less than 15 gsm, the filtration efficiency may decrease as the deviation increases, or uniform filtration efficiency may not be expressed, and if the basis weight is more than 40 gsm, the air permeability may decrease, and the pressure loss may increase. Further, if the average pore diameter of the first support body 10 is less than 5 μm, the air permeability may decrease, and the pressure loss may increase, and if the average pore diameter is more than 15 μm, the filtration efficiency may decrease. In addition, if the average diameter of the first fibers forming the first support body 10 is excessively small, the air permeability may decrease and the pressure loss may increase, and if the average fiber diameter is excessively large, the filtration efficiency may decrease.

In addition, the first support body 10 may have an air permeability of 25 to 40 cfm, and preferably, an air permeability of 30 to 36 cfm. If the air permeability of the first support body is less than 25 cfm, the pressure loss may increase, and if the air permeability is more than 40 cfm, the filtration efficiency may decrease or uniform filtration efficiency may not be expressed.

In addition, the fibers forming the first support body 10 may include a synthetic polymer component selected from the group consisting of polyester-based, polyurethane-based, polyolefin-based and polyamide-based compounds; or a natural polymer component including cellulose-based compounds, and for example, it may include polypropylene.

Next, the nanofiber web 20 will be described.

The nanofiber web 20 is a web-shaped member through which air that has passed through the first support body 10 passes and is filtered again.

The nanofiber web 20 is responsible for the physical filtration of a fluid to be treated, preferably, air to be treated, and may have a three-dimensional network structure formed by randomly stacking a plurality of nanofibers three-dimensionally.

The second nanofiber web 20 is formed by accumulating nanofibers, and these nanofibers may form a three-dimensional network structure. The nanofiber web 20 may be designed to have a pore diameter capable of physically filtering fine dust of PM 2.5 or less, and a flow path may be formed to prevent a decrease in the flow rate of air passing through. As the nanofiber web 20 is provided with the above-described first support body 10, it compensates for the problem of reduced collection efficiency due to static electricity that may occur in the electrostatically treated first support body 10, and it may function to maintain the initially designed filtration efficiency even for a long period of time.

Specifically, the electrostatically treated first support body 10 adsorbs dust to the fiber surface using electrostatic force, and as time passes, the electrostatic force decreases, and as the filtration efficiency deteriorates to less than 50% of the initially designed efficiency after 5 months of usage time, there is a problem in that the replacement cycle is very short.

However, when using the nanofiber web 20 together with the electrostatically treated first support body 10, compared to a case in which the collection efficiency continues to decrease when only the first support body 10 is used, the reduction in collection efficiency is small when the first support body 10 and the nanofiber web 20 are used together, and even if it continues for several months, the collection efficiency may maintain 95% or more of the initially designed values.

The nanofibers forming the nanofiber web 20 may be formed of a known fiber-forming component. However, preferably, a fluorine-based compound may be included as a fiber-forming component. The fluorine-based compound may be used without limitation in the case of a known fluorine-based compound that may be manufactured as nanofibers, and for example, it may include at least one compound selected from the group consisting of polytetrafluoroethylene (PTFE)-based, tetrafluoroethylene-perfluoroalkyl vinyl ether copolymer (PFA)-based, tetrafluoroethylene-hexafluoropropylene copolymer (FEP)-based, tetrafluoroethylene-hexafluoropropylene-perfluoroalkyl vinyl ether copolymer (EPE)-based, tetrafluoroethylene-ethylene copolymer (ETFE)-based, polychlorotrifluoroethylene (PCTFE)-based, chlorotrifluoroethylene-ethylene copolymer (ECTFE)-based and polyvinylidene fluoride (PVDF)-based compounds. In this case, when the nanofibers include PVDF as a fiber-forming component, the weight average molecular weight of the PVDF may be 10,000 to 1,000,000, and preferably, 300,000 to 600,000, but is not limited thereto. Meanwhile, depending on the purpose, it may further include a known heterogeneous compound such as polyethersulfone, polyacrylonitrile (PAN), polyurethane, polyester and the like, as a fiber-forming component other than a fluorine-based compound. However, as the nanofiber web formed of PVDF has uniform fineness compared to other materials and may clearly form a three-dimensional network structure, PVDF may be more suitable as a material of the nanofiber web compared to other materials.

The average fiber diameter of a plurality of nanofibers forming the nanofiber web 20 may be 0.05 to 0.5 µm, and preferably, the average fiber diameter may be 0.1 to 0.4 µm. In addition, the nanofiber web 20 may have a basis weight of 0.4 to 2.5 gsm, and preferably, 0.5 to 2 gsm. If the basis weight of the nanofiber web is less than 0.4 gsm, the filtration efficiency may decrease as the deviation increases, the filtration efficiency may decrease after a long period of use, or uniform filtration efficiency may not be expressed, and if the basis weigh is more than 2.5 gsm, the air permeability may be lowered, and the pressure loss may increase.

In addition, the nanofiber web 20 may have an average pore diameter of 0.3 to 2.5 µm, and preferably, an average pore diameter of 0.5 to 2 µm. If the average pore diameter of the nanofiber web is less than 0.3 µm, the air permeability may decrease and the pressure loss may increase, and if the average pore diameter is more than 2.5 µm, the filtration efficiency may decrease or the filtration efficiency may be reduced after a long period of use.

In addition, the nanofiber web 20 may have an air permeability of 4 to 35 cfm, and preferably, an air permeability of 4.5 to 30 cfm. If the air permeability of the nanofiber web 20 is less than 4 cfm, the pressure loss may increase, and if the air permeability is more than 35 cfm, the filtration efficiency may decrease or after a long period of use, the filtration efficiency may be reduced, or uniform filtration efficiency may not be expressed.

In addition, if the average fiber diameter of the nanofibers forming the nanofiber web 20 is excessively small, the air permeability may decrease and the pressure loss may increase, and if the average fiber diameter is excessively large, the filtration efficiency may decrease.

Meanwhile, the nanofiber web 20 may be a water/oil repellent nanofiber web formed by coating a water/oil repellent on the surface of the nanofiber web or spinning a spinning solution including a water/oil repellent, and preferably formed by spinning a spinning solution including a water/oil repellent. Accordingly, it may be more advantageous when applied to an outdoor environment, and it may be more advantageous in terms of water/oil repellency as well as excellent air permeability and filtration efficiency.

Figure 2:
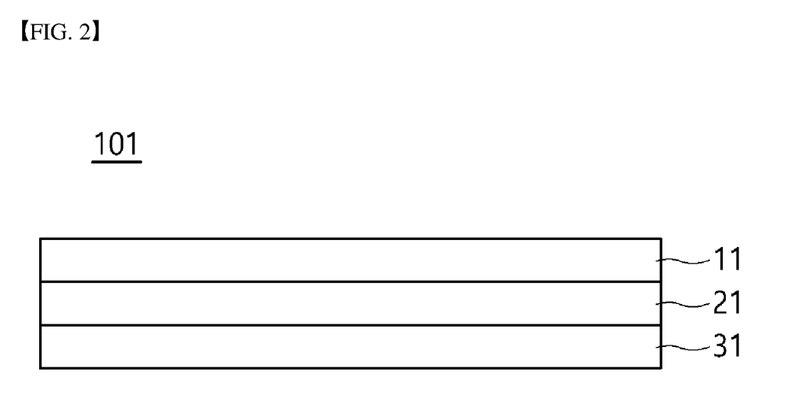
FIG. 2 is a cross-sectional view of the filter medium according to another exemplary embodiment of the present invention.
Figure 3:
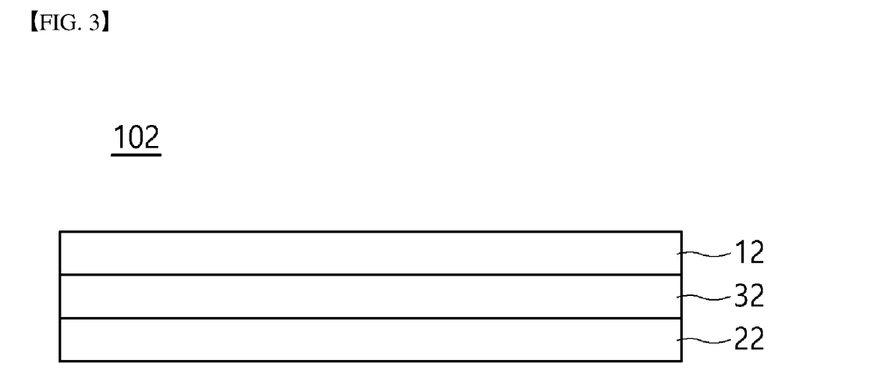
FIG. 3 is a cross-sectional view of the filter medium according to still another exemplary embodiment of the present invention.

Meanwhile, as illustrated in FIG. 2, the filter medium 101 according to an exemplary embodiment of the present invention may include a second support body 31 on the other surface of the nanofiber web 21 corresponding to the first support body 11. Alternatively, as illustrated in FIG. 3, the filter medium 102 according to another exemplary embodiment of the present invention may include a second support body 32 between the first support body 12 and the nanofiber web 22.

The second support bodies 31, 32 perform the support function of filter media, and there is no particular limitation in the case of a porous member capable of performing a support function in general, but in terms of its shape, preferably, it may be a woven fabric, a knitted fabric or a non-woven fabric. For example, in the case of a non-woven fabric, it may preferably be a dry non-woven fabric such as a chemical bonding non-woven fabric, a thermal bonding non-woven fabric, an airlaid non-woven fabric or the like, or a wet non-woven fabric, a spunlace non-woven fabric, a needle punching non-woven fabric or a melt blown non-woven fabric, and more preferably, it may be a thermal bonding non-woven fabric.

The second support bodies 31, 32 may have a basis weight of 25 to 75 gsm, and preferably, 30 to 70 gsm, and the second fibers forming the second support bodies 31, 32 may have a fiber average diameter of 10 to 30 µm, and preferably, an average fiber diameter of 15 to 25 µm, and the second support bodies 31, 32 may have an average pore diameter of 30 to 200 µm.

For example, as the second support bodies 31, 32 a synthetic polymer component selected from the group consisting of polyester-based, polyurethane-based, polyolefin-based and polyamide-based compounds; or a natural polymer component including cellulose-based compounds may be used.

In addition, as another example, the second fibers forming the second support bodies 31,32 may be composite fibers including a low melting point component. The composite fibers may include a support component and a low melting point component and may be disposed such that at least a portion of the low melting point component is exposed to the outer surface. For example, these fibers may be sheath-core composite fibers in which a support component forms a core part and a low melting point component forms a sheath part surrounding the core part, or side-by-side composite fibers in which a low melting point component is disposed on one side of the support component. The low melting point component and the support component may preferably be polyolefin-based in terms of flexibility and elongation of the support body as described above, and for example, the support component may be polypropylene, and the low melting point component may be polyethylene. However, the present invention is not limited thereto.

Figure 4:
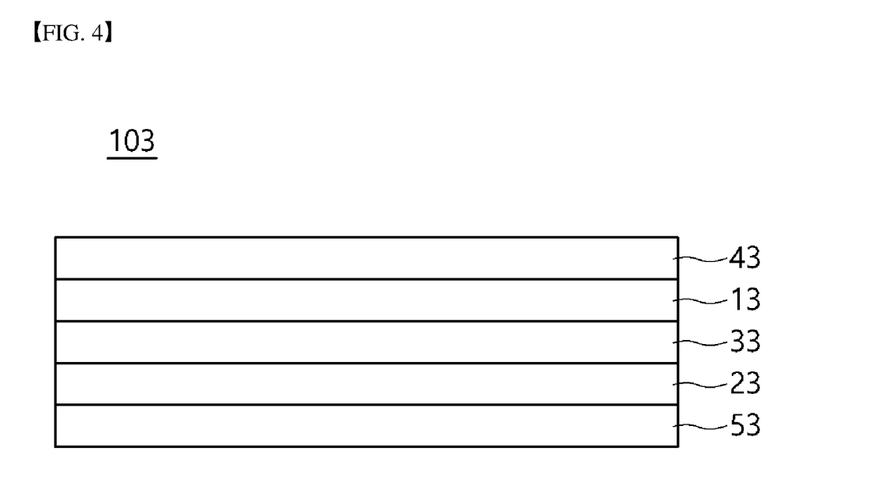
FIG. 4 is a cross-sectional view of the filter medium according to still another exemplary embodiment of the present invention.

Meanwhile, as illustrated in FIG. 4, the filter medium 103 according to still another exemplary embodiment of the present invention may include a second support body 33 between the first support body 13 and the nanofiber web 23, and may further include a third support body 43 on the other surface of the first support body 13 corresponding to the side of the second support body 33, and may further include a fourth support body 53 on the other surface of the nanofiber web 23.

The third support body 43 supports the filter medium 103 and functions to improve water/oil repellency, and in this case, the third support body 43 may preferably be a non-woven fabric, and more preferably, it may be a dry non-woven fabric such as a chemical bonding non-woven fabric, a thermal bonding non-woven fabric, an airlaid non-woven fabric or the like, or a wet non-woven fabric, a spunlace non-woven fabric, a needle punching non-woven fabric, a spunbonded non-woven fabric or a melt blown non-woven fabric, and more preferably, it may be a spunbonded non-woven fabric.

Meanwhile, as the third support body 43, a synthetic polymer component selected from the group consisting of polyester-based, polyurethane-based, polyolefin-based and polyamide-based compounds; or a natural polymer component including cellulose-based compounds may be used.

Further, in order to impart water/oil repellency, the third support body 43 may be a water/oil repellent spunbonded non-woven fabric which is implemented through spinning by including a water/oil repellent in a spinning solution together with the above-described polymer or through a predetermined water/oil repellent treatment.

In addition, the third support body 43 may be formed of a plurality of third fibers having a predetermined fiber average diameter. If the average fiber diameter of the third fibers forming the third support body is excessively low, the air permeability may decrease and the pressure loss may increase, and if it is excessively high, the water/oil repellency may decrease or the filtration efficiency may decrease.

In addition, the third support body 43 may exhibit a predetermined basis weight. If the basis weight of the third support is excessively low, the filtration efficiency may decrease as the deviation increases, or uniform filtration efficiency may not be expressed, and the water/oil repellency may decrease, and if the basis weight is excessively high, the air permeability may be lowered, and the pressure loss may increase.

The fourth support body 53 performs a function of preventing damage when the filter medium 103 is bent and implemented as a composite filter to be described below.

In this case, the fourth support body 53 may be preferably a non-woven fabric, more preferably, it may be a dry non-woven fabric such as a chemical bonding non-woven fabric, a thermal bonding non-woven fabric, an airlaid non-woven fabric or the like, or a wet non-woven fabric, a spunlace non-woven fabric, a needle punching non-woven fabric, a spunbonded non-woven fabric or a melt blown non-woven fabric, and more preferably, it may be a spunbonded non-woven fabric.

Meanwhile, as the fourth support body 53, a synthetic polymer component selected from the group consisting of polyester-based, polyurethane-based, polyolefin-based and polyamide-based compounds; or a natural polymer component including cellulose-based compounds may be used.

In addition, the fourth support body 53 may be formed of a plurality of fourth fibers having a predetermined fiber average diameter. If the average fiber diameter of the fourth fibers forming the fourth support body is excessively low, the air permeability may decrease and the pressure loss may increase, and damage may not be prevented when the filter medium is bent, and if it is excessively high, the filtration efficiency may be reduced.

In addition, the fourth support body 53 may exhibit a predetermined basis weight. If the basis weight of the fourth support is excessively low, the filtration efficiency may decrease as the deviation increases, or uniform filtration efficiency may not be expressed, and damage may not be prevented when the filter medium is bent, and if the basis weight is excessively high, the air permeability may decrease, and the pressure loss may increase.

Meanwhile, the above-described filter media 100, 101, 102, 103 according to the present invention may have a filtration efficiency of 99.5% or more, preferably, a filtration efficiency of 99.6% or more, more preferably, a filtration efficiency of 99.7% or more, and much more preferably, a filtration efficiency of 99.8% or more. In addition, the above-described filter media 100, 101, 102, 103 may have a pressure loss of 20 to 120 mmH$_2$O, and preferably, a pressure loss of 25 to 110 mmH$_2$O. If the filtration efficiency of the filter medium is less than 99.5%, it may not be applied to a mask, an air filter or a ventilation-type air purifier, which will be described below, as it may not exhibit a desired level of filtration efficiency. In addition, if the pressure loss of the filter medium is less than 20 mmH$_2$O, the filtration efficiency may be poor, and if the pressure loss is more than 120 mmH$_2$O, the air permeability may decrease.

In addition, the above-described filter media 100, 101, 102, 103 according to the present invention may have a reduction rate of filtration efficiency of 8% or less, preferably, a reduction rate of filtration efficiency of 7% or less, more preferably, a reduction rate of filtration efficiency of 6% or less, and much more preferably, a reduction rate of filtration efficiency of 5.5% or less, as measured according to Measurement Method 1 below.

[Measurement Method 1]

After filtering paraffin oil with an average particle diameter of 0.4 μm through a filter medium at 95 LPM for 5 hours, the filtration efficiency is measured, and the reduction rate of the filtration efficiency is measured by calculating the reduced filtration efficiency after 5 hours compared to the initial filtration efficiency.

If the reduction rate of the filtration efficiency is more than 8%, it may not be possible to compensate for the problem of reduction in collection efficiency due to static electricity that may occur in the electrostatically treated first support body 10.

Figure 5:
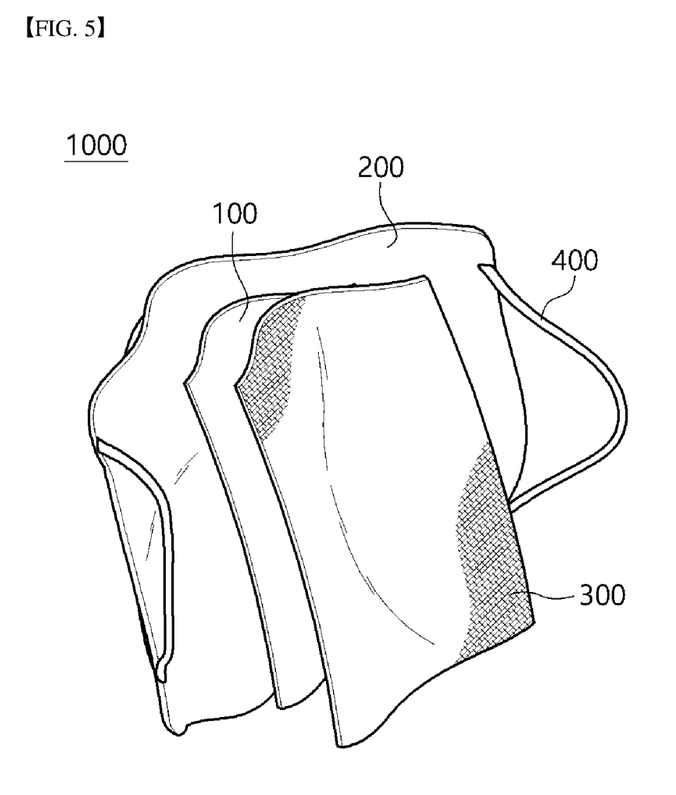
FIGS. 5 and 6 are perspective views of masks provided with the filter medium according to an exemplary embodiment of the present invention.

Meanwhile, as illustrated in FIG. 5, in a mask 1000 provided with a first fabric 200 that forms an externally exposed surface, a second fabric 300 that is fixed to at least a part of the first fabric 200 to form a receiving portion and is in close contact with the wearer's face, and ear bands 400 provided at both ends of the first fabric 200, the above-described filter media 100, 101, 102, 103 may be provided in the receiving portion.

The first fabric 200 may exhibit hydrophobicity, quick drying, water repellency and the like in order to prevent the generation and proliferation of bacteria due to external water or moisture or saliva of the user.

In addition, the first fabric 200 may be used without limitation, as long as it is a material of a mask skin that is commonly used in the art, but preferably, it may be formed by including at least one selected from natural fibers and synthetic fibers, and more preferably, it is more advantageous to use polyester in terms of expressing hydrophobicity, quick drying and water repellency.

For example, as the natural fibers, fibers composed of any one of Korean paper, polylactic acid (PLA; biodegradable fiber), cotton, hemp, wool and silk may be used. For example, as the synthetic fibers, fibers composed of any one of nylon, polyester-based, polyvinyl chloride-based, polyacrylonitrile-based, polyamide-based, polyolefin-based, polyurethane-based and polyfluoroethylene-based compounds may be used.

Moreover, as the synthetic fibers, fibers obtained by using the following polymers may be used.

Polyethylene resins, such as low-density polyethylene resin (LDPE), ultra-low-density polyethylene resin (LLDPE), high-density polyethylene (HDPE), ethylene-vinyl acetate resin (EVA), copolymers thereof, etc.

Polystyrene resins, such as HIPS, GPPS, SAN, etc.

Polypropylene resins, such as HOMO PP, RANDOM PP, copolymers thereof

Transparent or general ABS (acrylonitrile-butadiene-styrene terpolymer)

Hard PVC

Engineering plastics, such as nylon, PRT, PET, POM (acetal), PC, urethane, powder resin, PMMA, PES, etc.

In addition, it is also possible to use other known fibers for the natural fibers or synthetic fibers, in addition to the above-described fiber materials.

Meanwhile, the first fabric 200 may be a fabric or knitted fabric manufactured by weaving or knitting.

First, the weave structure of the woven fabric may be subject to any one method selected from the group consisting of plain weave, twill weave, satin weave and double weave.

When the plain weave, twill weave and satin weave are referred to as three basic types of weave, the specific weaving method of each of the three basic types of weave is subject to a typical weaving method. On the basis of the three basic types of weave, the structure may be modified or a few structures may be mixed to obtain fancy weave. Examples of fancy plain weave include rib weave, basket weave and the like, examples of fancy twill weave include elongated twill weave, broken twill weave, skip twill weave, pointed twill weave and the like, and examples of fancy satin weave include irregular satin weave, double satin weave, satin check weave, granite satin weave and the like.

The double weave is a fabric-weaving method in which either warp or weft is doubled or both of them are doubled, and the specific method thereof may be a typical weaving method of the double weave.

However, the present invention is not limited to the description of the aforementioned weave structure, and the density of warp and weft in weaving is not particularly limited.

Preferably, the knitting may be subject to weft knitting or warp knitting, and the specific method of the weft knitting and the warp knitting may be subject to typical weft knitting and warp knitting.

Through the weft knitting, specifically, weft knit such as plain knit, rib knit, purl knit and the like may be manufactured, and through the warp knitting, specifically, warp knit such as tricot, Milanese, raschel and the like may be manufactured.

In addition, as described above, the second fabric 300 is fixed to at least a portion of the first fabric 200 to form a receiving portion for receiving the filter medium described above, and is in close contact with the face of the wearer. In this case, preferably, the upper and lower ends of the second fabric 300 may be fixed to the first fabric 200 to form a receiving portion.

Meanwhile, the second fabric 300 may have the same or different material and characteristics as the first fabric 200 described above, and preferably, as it may have the same material and characteristics, the description thereof will be omitted.

Figure 6:
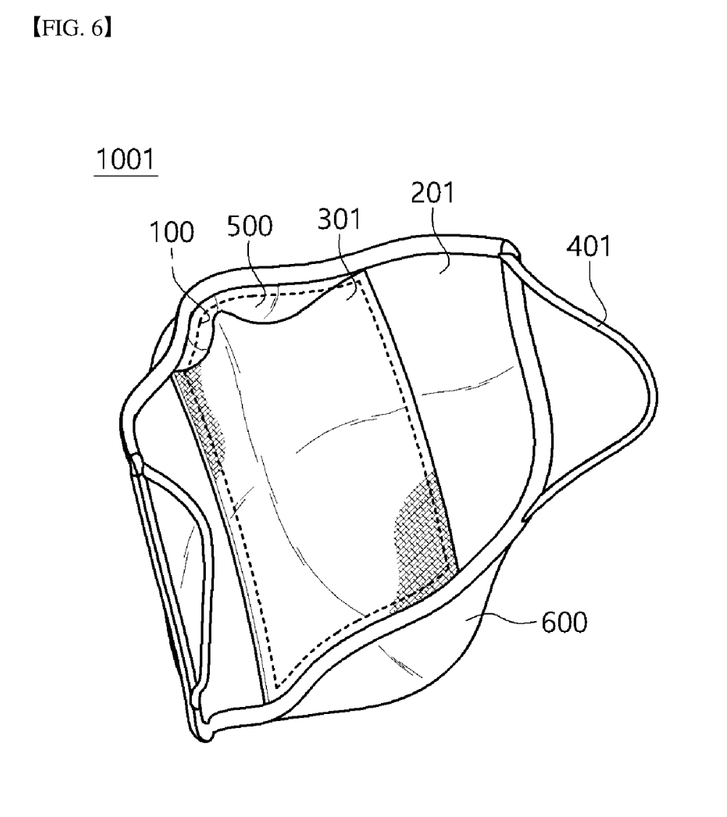

Meanwhile, as illustrated in FIGS. 5 and 6, the masks 1000, 1001 may be provided with a relatively small area of the second fabrics 300, 301 compared to the first fabrics 200, 201, and preferably, the second fabrics 300, 301 may be provided with a predetermined area that may be in close contact with the wearer's nose and mouth to cover the same. In addition, the masks 1000, 1001 may be provided with the filter media 100, 101 in a relatively small area compared to the first fabrics 200, 201. In addition, the filter media 100, 101 may be provided with a smaller area than the second fabrics 300, 301, but the present invention not limited thereto.

In addition, the masks 1000, 1001 may include ear bands 400, 401 provided on both side ends of the first fabrics 200, 201, and as the ear bands 400, 401 may have the same material and shape as known ear bands, the present invention does not particularly limit the same.

Meanwhile, as illustrated in FIG. 2, the mask 1001 may further include a nose pad 500 provided at the upper end of the first fabric 201 and a chinrest 600 provided at the lower end of the first fabric 201.

The nose pad 500 serves to prevent the inflow of outside air and the discharge of inside air in areas other than the first fabric 201 and the second fabric 301 when the user breathes, and as it may have the same material and shape as known nose pads, the present invention does not particularly limit the same. In addition, since the chinrest 600 may have the same material and shape as known chinrests, the present invention does not particularly limit the same.

Figure 7:
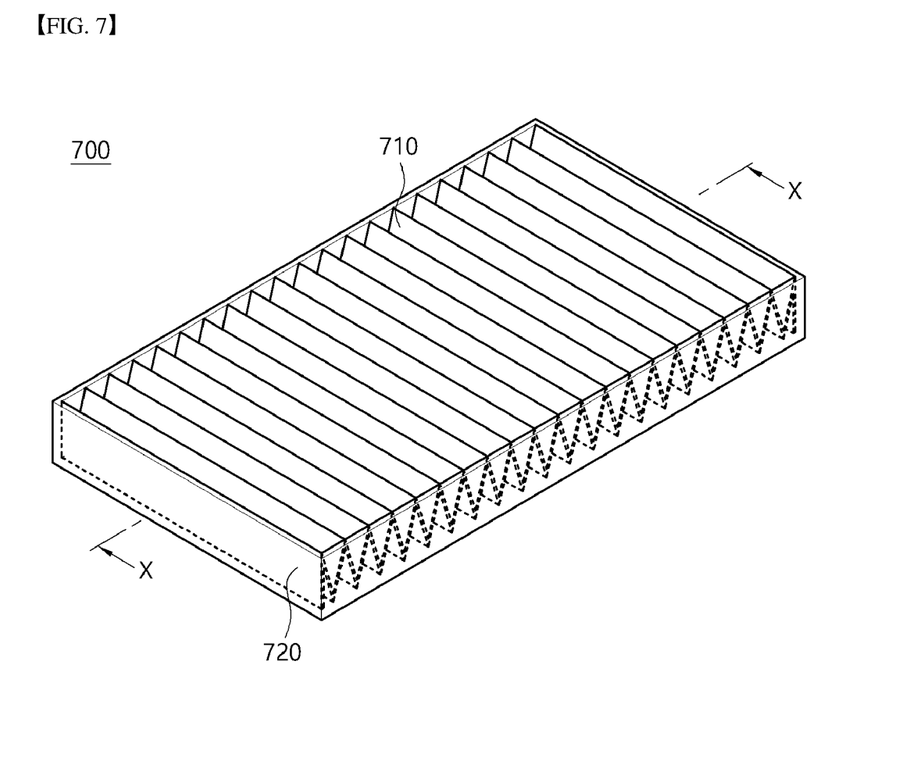
FIG. 7 is a perspective view of the composite filter according to an exemplary embodiment of the present invention.
Figure 8:
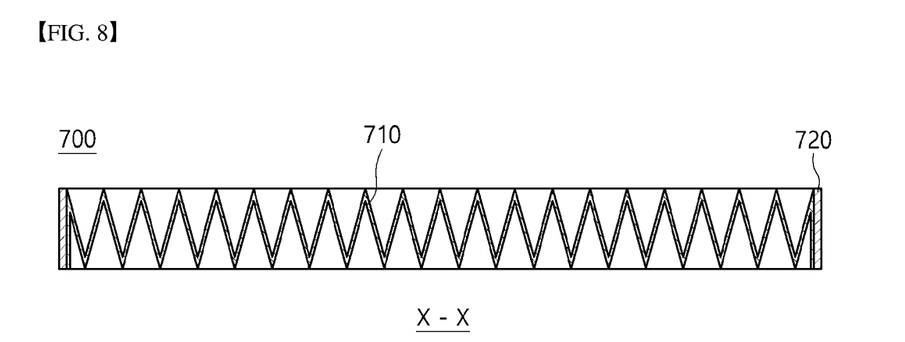
FIG. 8 is a cross-sectional view of the composite filter according to an exemplary embodiment of the present invention.
Figure 9:
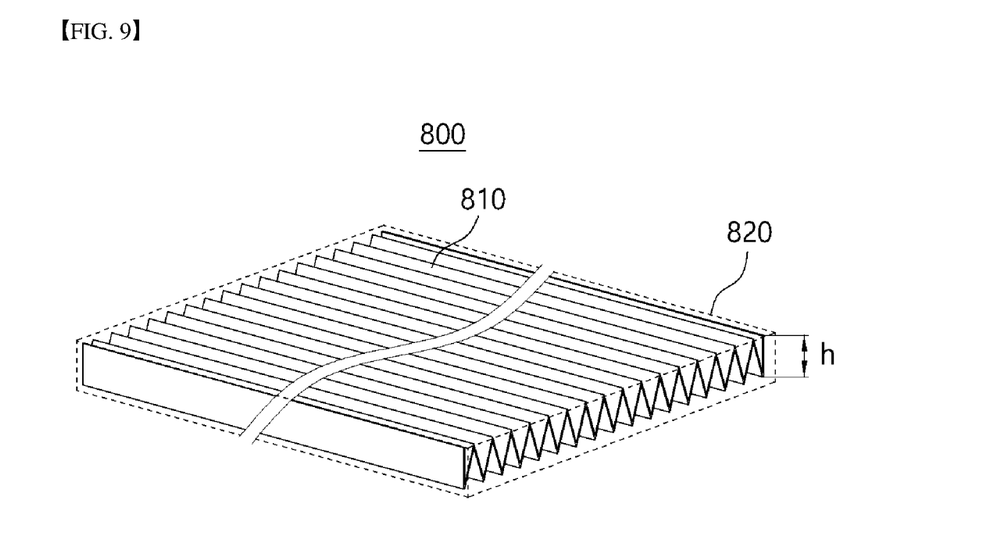
FIG. 9 is a perspective view of the composite filter according to an exemplary embodiment of the present invention.

Meanwhile, as illustrated in FIGS. 7 to 9, the composite filters 700, 800 according to the present invention are provided by bending the above-described filter media 710, 810. Accordingly, it is possible to further improve the filtration efficiency by maximizing the filtration area.

In addition, the composite filters 700, 800 according to the present invention may further include filter frames 720, 820 disposed to surround at least one surface of the bent filter media 710, 810.

The filter frames 720, 820 may be disposed to surround at least one surface of the bent filter media 710, 810 as described above, and preferably may be disposed to surround the front side of the bent filter media 710, 820.

However, the filter frame is not particularly limited in the present invention as a known filter frame may be used.

Meanwhile, the filter media 710, 810 may be bent and provided so as to have a peak height of 5 to 55 mm, and preferably, a peak height of 10 to 50 mm. If the peak height is less than 5 mm, the filtration efficiency may decrease and the pressure loss may increase as the area of filter media provided in the composite filter is small. If the peak height is more than 55 mm, the peaks may be attached to the filter area, resulting in a decrease in the filtration area, and if the pressure is high, the peaks may bend or deform. Meanwhile, in this case, the peak height represents the height from the valley to the peak.

In addition, the composite filters 710, 810 according to the present invention may include 70 to 95 of the peaks, preferably, 73 to 91 peaks, and more preferably, 77 to 86 peaks, per 300 mm in length, and the filter medium may be included by 1.3 to 8.5 m, preferably, 1.5 to 8.2 m, and more preferably, 2 to 7.5 m, per 300 mm in length. As the number of peaks included in the composite filters 710, 810 and the length range of the filter media are satisfied, it is possible to simultaneously achieve all of the effects in which the removal efficiency is excellent, the pressure loss is low, and the removal efficiency is prevented from decreasing due to the high specific surface area.

Meanwhile, the above-described composite filters 710, 810 may be implemented as air filters, and in this case, for example, a pleated structure including a plurality of peaks has been described, but the composite filter may be implemented without limitation in shape, such as a flat-plate type, a corrugated structure, a cylindrical shape and the like.

Figure 10:
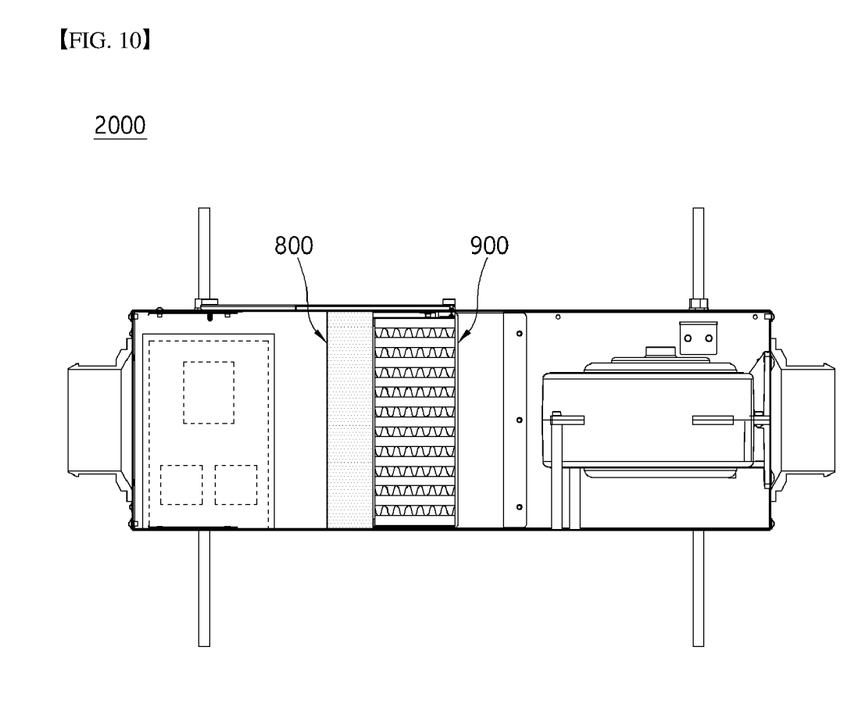
FIG. 10 is a cross-sectional view of a ventilation-type air purifier equipped with the composite filter according to an exemplary embodiment of the present invention.

Meanwhile, as illustrated in FIG. 10, the composite filter 800 according to the present invention may be applied to a ventilation-type air purifier 2000. In this case, the ventilation-type air purifier 2000 may be any one of a wall-mounted type, a stand type and a ceiling type.

For example, a ceiling-type ventilation air purifier 2000 illustrated in FIG. 10 will be described.

The ceiling-type ventilation air purifier may include a housing, a first blower, a second blower, a heat exchanger 900 and a composite filter 800.

The housing may be formed to have an overall external shape and may be formed to have an internal space such that the first blower, the second blower, the heat exchanger and the filter member may be disposed.

Meanwhile, the housing may include a plurality of ports communicating with the internal space such that indoor air and outdoor air may be discharged after being introduced into the internal space.

For example, the plurality of ports may include an indoor air inlet for introducing indoor air into the internal space, an indoor air outlet for discharging the indoor air introduced into the internal space to the outside, an outdoor air inlet for introducing outdoor air into the internal space and an outdoor air outlet for discharging the outdoor air introduced into the internal space into the indoor space.

Meanwhile, in the ceiling-type ventilation air purifier 2000, the indoor air and outdoor air respectively introduced into the internal space through the indoor air inlet and the outdoor air inlet may be heat-exchanged without mixing with each other, and then discharged from the internal space to the outside.

To this end, a heat exchanger 900 may be disposed in the internal space such that both outdoor air sucked through the first blower and indoor air sucked through the second blower pass through.

In this case, the above-described composite filter 800 may be disposed on the side of the heat exchanger such that the outdoor air introduced into the internal space is filtered and then introduced into the heat exchanger 900. Accordingly, in the outdoor air supplied from the outside to the indoor space through the operation of the first blower, foreign substances such as yellow dust or fine dust are removed in the process of passing through the composite filter 800, thereby improving the quality of indoor air.

For the detailed description of the ventilation-type air purifier, since Korean Application Nos. 10-2020-0070790, 10-2020-0068449 and 10-2020-0070792, which are inventions of ventilation-type air purifiers filed by the present Applicant, may be incorporated by reference, the detailed description thereof will be omitted.

MODES OF THE INVENTION

The present invention will be described in more detail through the following examples, but the following examples do not limit the scope of the present invention, and these examples should be interpreted to help the understanding of the present invention.

EXAMPLE

Example 1: Manufacture of Filter Medium

A filter medium was manufactured by sequentially stacking a first support body which is an electrostatically treated polypropylene melt blown non-woven fabric with a basis weight of 30 gsm, an average pore diameter of 10 μm and an air permeability of 33 cfm formed by stacking a plurality of first fibers having an average fiber diameter of 5 μm, a second support body which is a low-melting polyester thermal bonding non-woven fabric with a basis weight of 70 gsm, an average pore diameter of 150 μm and an air permeability of 836 cfm formed by stacking a plurality of second fibers having an average fiber diameter of 20 μm, and a PVDF nanofiber web with a basis weight of 1 gsm, an average pore diameter of 0.84 μm and an air permeability of 10 cfm formed by stacking a plurality of nanofibers with an average fiber diameter of 0.3 μm.

Examples 2 to 25 and Comparative Example 1

Filter media as shown in Tables 1 to 3 below were manufactured in the same manner as in Example 1, except that the basis weight, average pore diameter and air permeability of the nanofiber web, and the basis weight, average pore diameter, air permeability and inclusion of the first support were changed.

Experimental Example

For the filter media manufactured according to the examples and comparative example, the following physical properties were evaluated and shown in Tables 1 to 3.

1. Measurements of Pressure Loss and Filtration Efficiency

For the filter media manufactured according to the examples and comparative example, paraffin oil in the form of an aerosol having a particle concentration of 20*5 mg/m$^3$ and an average particle diameter of 0.4 μm was filtered at 95 LPM through an automatic filter tester (TSI 8130A-EN, TSI Incorporated (USA)), and the pressure loss and filtration efficiency in this case were measured.

2. Reduction Rate of Filtration Efficiency

For the filter media manufactured according to the examples and comparative example, the pressure loss and filtration efficiency were measured every minute by continuously filtering for 5 hours by the measurement method of filtration efficiency, and the reduction rate of the filtration efficiency was measured by calculating the reduced filtration efficiency after 5 hours compared to the initial filtration efficiency.

TABLE 1

| Classification | | Example 1 | Example 2 | Example 3 | Example 4 | Example 5 | Example 6 |
|---|---|---|---|---|---|---|---|
| Nanofiber web | Basis weight (gsm) | 1 | 0.28 | 0.5 | 2 | 3.2 | 2.2 |
| | Average port diameter (μm) | 0.84 | 1.82 | 1.48 | 0.73 | 0.54 | 0.22 |
| | Air permeability (cfm) | 10 | 50 | 30 | 4.5 | 2.1 | 4.1 |
| First support body | Basis weight (gsm) | 30 | 30 | 30 | 30 | 30 | 30 |
| | Average port diameter (μm) | 10 | 10 | 10 | 10 | 10 | 10 |
| | Air permeability (cfm) | 33 | 33 | 33 | 33 | 33 | 33 |
| Pressure loss (mmH$_2$O) | | 57.6 | 18.5 | 28.3 | 107.1 | 214.2 | 148.9 |
| Filtration efficiency (%) | | 99.9976 | 99.8623 | 99.9596 | 99.9996 | 99.9999 | 99.9148 |
| Filtration efficiency after 5 hours (%) | | 94.5339 | 89.7794 | 94.1749 | 94.8637 | 94.8802 | 94.8685 |
| Reduction rate of filtration efficiency (%) | | 5.4637 | 10.0829 | 5.7847 | 5.1359 | 5.1197 | 5.0463 |

TABLE 2

| Classification | | Example 7 | Example 8 | Example 9 | Example 10 | Example 11 | Example 12 |
|---|---|---|---|---|---|---|---|
| Nanofiber web | Basis weight (gsm) | 1.6 | 0.6 | 0.47 | 1 | 1 | 1 |
| | Average port diameter (μm) | 0.5 | 2 | 2.7 | 0.84 | 0.84 | 0.84 |
| | Air permeability (cfm) | 11.7 | 26.1 | 34 | 10 | 10 | 10 |
| First support body | Basis weight (gsm) | 30 | 30 | 30 | 10 | 20 | 38 |
| | Average port diameter (μm) | 10 | 10 | 10 | 11.7 | 10.2 | 8.6 |
| | Air permeability (cfm) | 33 | 33 | 33 | 20 | 30 | 36 |
| Pressure loss (mmH$_2$O) | | 96.9 | 48.7 | 22.4 | 20.7 | 41.3 | 89.6 |
| Filtration efficiency (%) | | 99.9003 | 99.9669 | 99.7614 | 98.4014 | 99.8819 | 99.9977 |
| Filtration efficiency after 5 hours (%) | | 94.6942 | 94.1887 | 91.2763 | 93.1866 | 94.3951 | 94.6490 |
| Reduction rate of filtration efficiency (%) | | 5.2061 | 5.7782 | 8.4851 | 5.2148 | 5.4868 | 5.3487 |

TABLE 3

| | | Example 13 | Example 14 | Example 15 | Example 16 | Example 17 | Comparative Example 1 |
|---|---|---|---|---|---|---|---|
| Nanofiber web | Basis weight (gsm) | 1 | 1 | 1 | 1 | 1 | — |
| | Average port diameter (μm) | 0.84 | 0.84 | 0.84 | 0.84 | 0.84 | — |
| | Air permeability (cfm) | 10 | 10 | 10 | 10 | 10 | — |
| First support body | Basis weight (gsm) | 44 | 39 | 34 | 27 | 18 | 30 |
| | Average port diameter (μm) | 7.4 | 3 | 7 | 12 | 18 | 10 |
| | Air permeability (cfm) | 45 | 26 | 31 | 33 | 39 | 33 |
| Pressure loss (mmH$_2$O) | | 153.2 | 126.5 | 77.3 | 44.9 | 21.8 | 11.4 |
| Filtration efficiency (%) | | 99.9982 | 99.9271 | 99.9134 | 99.8986 | 98.1268 | 99.7822 |
| Filtration efficiency after 5 hours (%) | | 94.6796 | 94.6112 | 94.4885 | 94.4010 | 93.4933 | 57.9174 |

TABLE 3-continued

|  | Example 13 | Example 14 | Example 15 | Example 16 | Example 17 | Comparative Example 1 |
|---|---|---|---|---|---|---|
| Reduction rate of filtration efficiency (%) | 5.3186 | 5.3159 | 5.4249 | 5.4976 | 4.6335 | 41.8648 |

As can be seen from Tables 1 to 3 above, it can be confirmed that Examples 1, 3, 4, 7, 8, 11, 12, 15 and 16, which satisfy all of the basis weight, average pore diameter and air permeability of the nanofiber web, and the basis weight, average pore diameter, air permeability and inclusion of the first support body according to the present invention, may simultaneously achieve all of the effects of appropriate pressure loss, excellent filtration efficiency and low reduction rates of the filtration efficiency, compared to Examples 2, 5, 6, 9, 10, 13, 14, 17 and Comparative Example 1, in which any one of the above is omitted.

Although an exemplary embodiment of the present invention has been described above, the spirit of the present invention is not limited to the exemplary embodiment presented in the present specification, and those skilled in the art who understand the spirit of the present invention will be able to easily suggest other exemplary embodiments by modifying, changing, deleting or adding components within the scope of the same spirit, but this is also said to be within the scope of the present invention.

The invention claimed is:

1. A composite filter comprising a filter medium, wherein the filter medium comprises:
    a first porous support body which has been electrostatically treated and is a melt blown non-woven fabric configured to use an electrostatic force to filter dust contained in air;
    a water- and oil-repellent nanofiber web which is disposed on one surface of the first porous support body and formed by accumulating nanofibers, wherein the nanofiber web has an average pore diameter of 0.3 to 2.5 µm, and an air permeability of 4 to 35 cfm;
    a second support body disposed between the first porous support body and the water- and oil-repellent nanofiber web, which is a thermal bonding non-woven fabric which performs a support function;
    a third support body disposed on an opposite surface of the first porous support body corresponding to a side of the second support body, which is a water- and oil-repellent spunbonded non-woven fabric; and
    a fourth support body disposed on an opposite surface of the nanofiber web corresponding to a side of the second support body, which is a spunbonded non-woven fabric that prevents damage during bending.

2. The composite filter of claim 1, wherein the nanofiber web has a basis weight of 0.4 to 2.5 gsm.

3. The composite filter of claim 1, wherein the first porous support body has a basis weight of 15 to 40 gsm.

4. The composite filter of claim 1, wherein the first porous support body has an average pore diameter of 5 to 15 µm, and an air permeability of 25 to 40 cfm.

5. The composite filter of claim 1, wherein the filter medium has a filtration efficiency of 99.5% or more, and a pressure loss of 20 to 120 mmH$_2$O.

6. The composite filter of claim 1, wherein a reduction rate of filtration efficiency measured according to Measurement Method 1 below is 8% or less:

<Measurement Method 1> an initial filtration efficiency is measured then, after filtering paraffin oil with an average particle diameter of 0.4 µm through the filter medium at 95 LPM for 5 hours, a reduced filtration efficiency is measured, and the reduction rate of filtration efficiency is measured by calculating the reduced filtration efficiency after 5 hours compared to the initial filtration efficiency.

7. The composite filter of claim 1, wherein the filter medium is a bent filter medium, and wherein the composite filter further comprises
    a filter frame surrounding at least one surface of the bent filter medium.

* * * * *